US009921718B2

(12) United States Patent
Kuster et al.

(10) Patent No.: US 9,921,718 B2
(45) Date of Patent: Mar. 20, 2018

(54) ADAPTATION OF A MENU TO A USE CONTEXT, AND ADAPTABLE MENU GENERATOR

(71) Applicant: Orange, Paris (FR)

(72) Inventors: Christine Kuster, Argentre du Plessos (FR); Valentin Millet, Montreal (CA); Suzanne Lebrun, Rennes (FR)

(73) Assignee: ORANGE, Paris (FR)

( * ) Notice: Subject to any disclaimer, the term of this patent is extended or adjusted under 35 U.S.C. 154(b) by 223 days.

(21) Appl. No.: 14/556,819

(22) Filed: Dec. 1, 2014

(65) Prior Publication Data

US 2015/0153914 A1   Jun. 4, 2015

(30) Foreign Application Priority Data

Nov. 29, 2013  (FR) ..................... 13 61881

(51) Int. Cl.
*G06F 13/00*     (2006.01)
*G06F 15/00*     (2006.01)
*G06F 3/0482*    (2013.01)

(52) U.S. Cl.
CPC ................. *G06F 3/0482* (2013.01)

(58) Field of Classification Search
CPC ............................ G06F 9/4856; G06F 3/0482
USPC ................. 715/777, 825, 762, 834
See application file for complete search history.

(56) References Cited

U.S. PATENT DOCUMENTS

| 8,402,391 B1* | 3/2013 | Doray | G06F 3/0482 715/834 |
|---|---|---|---|
| 2009/0276771 A1* | 11/2009 | Nickolov | G06F 9/4856 717/177 |
| 2010/0050128 A1* | 2/2010 | Chiang | G06F 9/4443 715/847 |
| 2011/0302148 A1* | 12/2011 | Kakade | G06F 17/30864 707/710 |

FOREIGN PATENT DOCUMENTS

| EP | 1248184 A1 | 10/2002 |
|---|---|---|
| EP | 1840705 A1 | 10/2007 |

OTHER PUBLICATIONS

French Search Report and Written Opinion dated Jun. 5, 2014 for corresponding French Application No. 1361881, filed Nov. 29, 2013.
English translation of the French Written Opinion dated Jun. 5, 2014 for corresponding French Application No. 1361881, filed Nov. 29, 2013.

* cited by examiner

*Primary Examiner* — Kevin Nguyen
(74) *Attorney, Agent, or Firm* — David D. Brush; Westman, Champlin & Koehler, P.A.

(57) ABSTRACT

A method is provided for adaptation of a menu to a use context. The menu has at least one global list of trigger elements The method includes replacement of a global list of trigger elements, when said menu is reproduced, with a shortened list having predicted trigger elements among the trigger elements of the global list. The predicted trigger elements are trigger elements that have a higher probability of being selected in the use context than a selection threshold. Thus, the shortened list is not fixed but adapts itself to the use context, allowing a different menu to be offered, notably as a function of the user and/or the terminal reproducing said menu and/or agenda, etc. Also provided are an adaptable menu generator and an application having an adaptable menu.

11 Claims, 6 Drawing Sheets

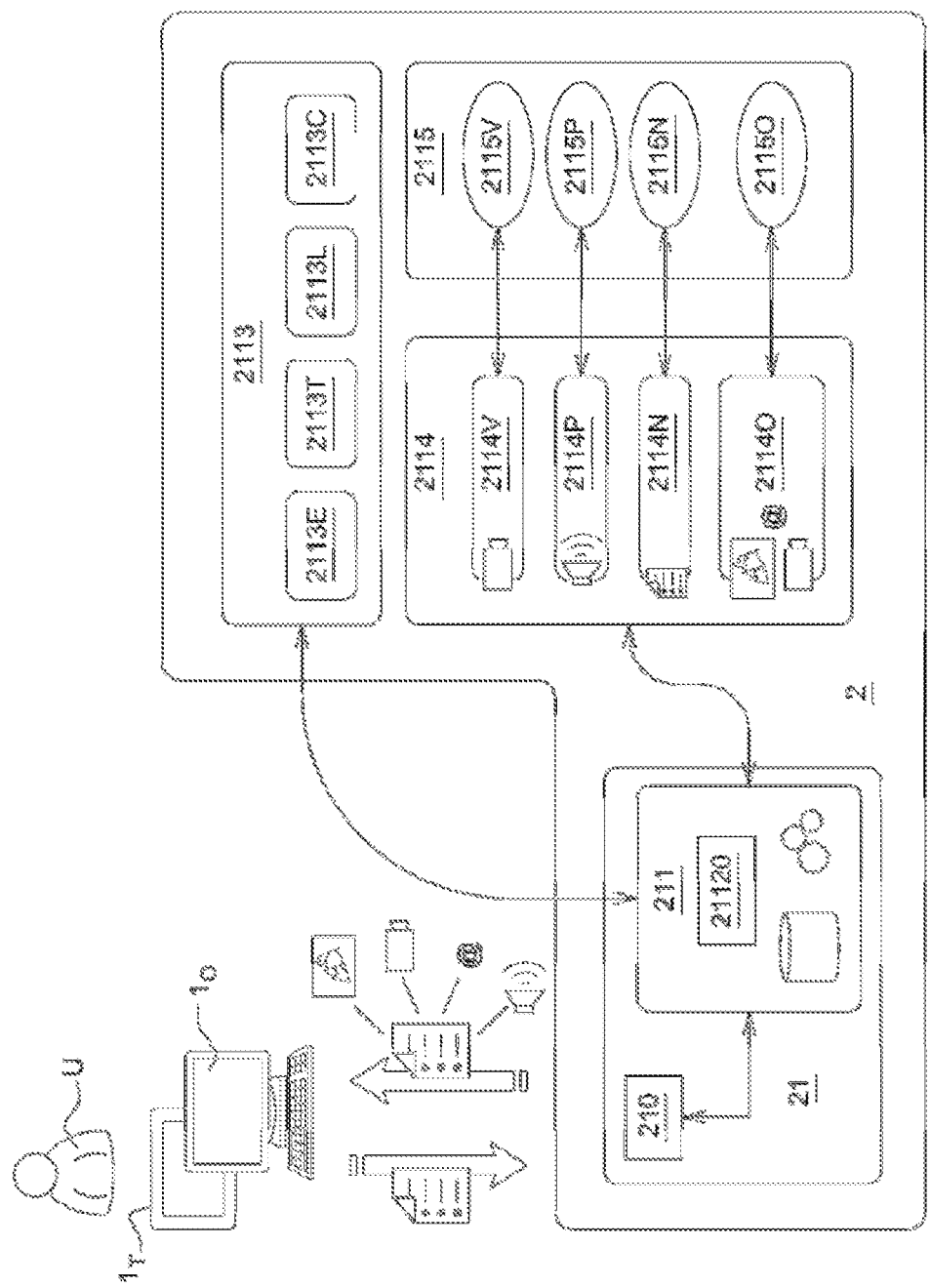

| m | LG1 | LG2 | ... | LG$_N$ |
|---|---|---|---|---|
| | trg 100 | | | |
| | trg 101 | | | |
| | trg 102 | | | |
| | ⋮ | | | |
| | TRG 1XY | | | | unb (trg 100) = 10     prob (trg 100, U = A) = 20
unb (trg 101) = 0      prob (trg 101, U = A) = 0
unb (trg 102) = 3      prob (trg 102, U = A) = 6
unb (trg 103) = 0      prob (trg 103, U = A) = 2
⋮                      ⋮
unb (trg 110) = 7      prob (trg 110, U = A) = 10

⇨ LR1 = {trg 100, trg 102, trg 103, trg 110"}

| m | LR1 | LR2 | ... | LR$_N$ |
|---|---|---|---|---|
| | trg 100 | | | |
| | trg 102 | | | |
| | trg 103 | | | |
| | ⋮ | | | |
| | trg 110 | | | |
| | ⋮ | | | |

Fig. 4c(1)

| m | LR1 | LR2 | ... | LR$_N$ |
|---|---|---|---|---|
| | ⋮ | | | |
| | trg 100 | | | |
| | ⋮ | | | |
| | trg 110 | | | |
| | ⋮ | | | |
| | trg 102 | | | |
| | ⋮ | | | |
| | trg 103 | | | |

Fig. 4c(2)

| m | LR1 | LR2 | ... | LR$_N$ |
|---|---|---|---|---|
| | TRG 100 | | | |
| | trg 102 | | | |
| | trg 103 | | | |
| | ⋮ | | | |
| | trg 110 | | | |
| | ⋮ | | | |

Fig. 4c(3)

ADAPTATION OF A MENU TO A USE CONTEXT, AND ADAPTABLE MENU GENERATOR

CROSS-REFERENCE TO RELATED APPLICATIONS

This Application claims priority under 35 U.S.C. § 119 from French Application FR 13 61881, filed Nov. 29, 2013, the content of which is incorporated herein by reference in its entirety.

FIELD OF THE DISCLOSURE

The disclosure concerns adaptation of a menu having trigger elements, an adaptable menu generator and an application having an adaptable menu.

BACKGROUND OF THE DISCLOSURE

In a computer interface, the aim of the various types of menu is to navigate through the various pages of the interface or MMI (Man Machine Interface) or to perform a specific action.

Numerous applications use menus made up of trigger elements for implementing actions linked to these trigger elements. Notably, a trigger element of a menu allows triggering either of processing on a datum or a previously selected content or of access to one or more data or content, etc.

The menus may be predefined: the list of trigger elements or commands does not vary and therefore remains fixed throughout the interface. There are also what are known as contextual menus in which the list of commands is variable and opens when the user selects, in a specific manner, a point on the interface thus providing a list of commands that varies according to the targeted point. Most often, the user triggers these menus using the secondary button (called right clicking) of the mouse.

As the applications evolve and offer more and more services: processing with access to a large number of data, content, etc., the number of lists of trigger elements and of trigger elements of the menus increases. This growing number of trigger elements gives rise to additional difficulties for the user of the application, who gets lost in finding processing operations for which he wishes to control the execution or the data, content which they wish to access.

For this reason, the applications often offer menus with shortened lists of trigger elements made up of a fixed subset of the trigger elements of the global list. This subset is notably made up of the trigger elements that are used most commonly in the previous version of the application by all of the users. In this case, on a given version of an application, the menus remain predefined.

Possibly, the menus may be personalizable by the user, who himself adds or removes a trigger element to/from a pre-existing list. These personalizable menus nevertheless remain fixed between two instances of use of the application. Two difficulties arise in this manual personalization:
  first is the difficulty in the actual choice owing to the large number of trigger elements that are generally available: difficulty in locating the trigger elements that could be useful to the user, difficulty in understanding the contribution of each available trigger element, etc.
  the second lies in the fact that the list remains fixed in the personalization state: if it is too short it will limit use of the application; if it is too long it risks confusing the user. Moreover, if the user changes, he will have to take steps to modify the personalization at the risk of holding up his use of the application.

Furthermore, some interfaces offer dynamic menus in which the list of commands is generated automatically and dynamically by the application following actions by the user. These are history menus such as the history of Word, which is compiled as documents are opened/closed and which offers, in its file history menu, a list of given files at an instant T and then, at an instant T+2, the same list to which will have been added a file that will have been opened at the instant T+1. This history can have the same disadvantages as the predefined menus after multiple use owing to a large number of open files, namely the difficulty of finding a file therein that is not among the last five files opened (for example).

In all of these menus, the notion of abundance or poverty of trigger elements in a list is not managed. Thus, the lists of trigger elements may be long to go through, just like drop-down menus for choosing countries, or incomplete on account of their fixed nature or in the case of manual personalization.

SUMMARY

An aspect of the present disclosure relates to a method for adaptation of a menu to a use context, said menu having at least one global list of trigger elements, said method for adaptation involving replacement of a global list of trigger elements, when said menu is reproduced, with a shortened list having predicted trigger elements among the trigger elements of said global list, said predicted trigger elements being trigger elements that have a higher probability of being selected in said use context than a selection threshold.

Thus, the shortened list is not fixed but adapts itself to the use context, allowing a different menu to be offered, notably as a function of the user and/or the terminal reproducing said menu and/or agenda, etc. The shorter the list, the more the risk of implementation of processing by mistake on a trigger element decreases.

Advantageously, the method for adaptation involves prediction of the trigger elements that have a higher probability of being selected in said use context than a selection threshold among the trigger elements of a global list of said menu.

Advantageously, the predicted trigger elements are a function of at least one content previously selected in an application using said menu.

In particular, the selection of a content using a first list from a menu of an application can have an impact on the shortening of a second list from a menu of the same application, and not just on the first list.

Thus, when a historic content is selected, the probability of selecting a trigger element for access to historic content or a trigger element for generation of a timeline increases, whereas this does not have an impact on the probability of selecting a trigger element for generation of a mathematical equation.

Advantageously, the predicted trigger elements are a function of at least one content previously injected into an application using said menu.

Thus, loading a document into an application from a database that is external to the application, notably from the Internet or a peripheral of the terminal of the user, such as a camera, a cell phone, a camcorder, etc., can affect the shortening of at least one list from a menu of this application.

Advantageously, the predicted trigger elements are a function of the trigger elements of said global list that have previously been selected in one and the same use context.

Thus, the prediction (whether or not performed within the adaptation method) is simplified because it takes into account the past instances of use of the menu in the same context. Notably, the result of the prediction may be a list of the trigger elements having a higher past use statistic in the same use context than a predetermined use threshold.

Advantageously, the predicted trigger elements are organized in said shortened list as a function of their probability of being selected in said use context.

Thus, the shortened list is organized from the trigger elements that have the highest probability of being selected among the trigger elements that have the lowest probability of being selected. This allows a reduction in the implementation errors for processing or access from the menu.

Advantageously, said shortened list furthermore has a trigger element allowing the global list to be displayed when said trigger element is selected.

Thus, all of the trigger elements of the global list remain easily accessible from the shortened list. This reduces the use of processing instead of less appropriate processing owing to the difficulty of finding the trigger element triggering it.

Advantageously, said method for adaptation involves reproduction of the predicted trigger elements of said shortened list as a function of the number of predicted trigger elements of said shortened list.

In particular, the adaptation method can thus size the trigger elements of a list in a manner inversely proportional to the number of trigger elements of the list.

Thus, the reproduction allows the user of the application to be guided in his selection to reduce selection errors.

Advantageously, said method for adaptation involves reproduction of the predicted trigger elements of said shortened list as a function of their probability of being selected in said use context.

Thus, the greater the probability of a trigger element being selected, the more the risk of implementation of processing by mistake instead of the processing linked to this trigger element decreases. The reason is that the adaptation method can thus size the trigger elements of a list in a manner proportional to their probability of being selected.

Advantageously, according to one implementation of the disclosure, the various steps of the method are implemented by a piece of software or computer program, said software comprising software instructions intended to be executed by a data processor of an adapter and being designed to control the execution of the various steps of said method.

An exemplary aim of the present disclosure is therefore also a program comprising program code instructions for the execution of the steps of the method for adaptation of a menu when said program is executed by a processor.

This program can use any programming language and be in the form of source code, object code or intermediate code between source code and object code such as in a partially compiled form or in any other desirable form.

A further aspect of the present disclosure relates to a method for generation of a menu having at least one global list of trigger elements, said method for generation of a menu involving adaptation of said menu to a use context by replacement of a global list of trigger elements, when said menu is reproduced, with a shortened list having predicted trigger elements among the trigger elements of said global list, said predicted trigger elements being trigger elements that have a higher probability of being selected in said use context than a selection threshold.

Advantageously, according to an implementation of the disclosure, the various steps of the method are implemented by a piece of software or computer program, said piece of software comprising software instructions intended to be executed by a data processor of a adaptable menu generator and being designed to control the execution of the various steps of said method.

An exemplary aim of the disclosure is therefore also a program comprising program code instructions for the execution of the steps of the method for generation of a menu when said program is executed by a processor.

This program can use any programming language and be in the form of source code, object code or intermediate code between source code and object code such as in a partially compiled form or in any other desirable form.

Another aspect of the present disclosure is an adapter for adapting a menu to a use context, said menu having at least one global list of trigger elements, said adapter having a switch for replacing, when said menu is reproduced, a global list of trigger elements of said menu with a shortened list having predicted trigger elements among the trigger elements of said global list, said predicted trigger elements being trigger elements that have a higher probability of being selected in said use context than a selection threshold.

Another aspect of the present disclosure relates to adaptable menu generator having at least one global list of trigger elements, said generator having an adapter for adapting said menu to a use context by replacement of a global list of trigger elements, when said menu is reproduced, with a shortened list having predicted trigger elements among the trigger elements of said global list, said predicted trigger elements being trigger elements that have a higher probability of being selected in said use context than a selection threshold.

Another aspect of the present disclosure relates to an application having a menu, said menu having at least one global list of trigger elements, said trigger elements allowing said application to implement predetermined actions associated with said trigger elements, said application having an adapter for adapting said menu to a use context by replacement of a global list of trigger elements, when said menu is reproduced, with a shortened list having predicted trigger elements among the trigger elements of said global list, said predicted trigger elements being trigger elements that have a higher probability of being selected in said use context than a selection threshold.

BRIEF DESCRIPTION OF THE DRAWINGS

The features and advantages will become more apparent upon reading the description, which is given by way of example, and the figures relating thereto, in which:

FIG. 3 shows a simplified diagram of an application example implementing an aspect of the present disclosure, FIGS. 4a, 4b, 4c(1), 4c(2) and 4c(3) respectively show a diagram of a menu without adaptation, a simplified diagram of generation of a shortened list according to an aspect of the present disclosure, and three variants of a menu adapted according to the invention, when a menu according to an aspect of the present disclosure is adapted, FIGS. 5a and 5b respectively show an illustration of a document allowing determination of predicted trigger elements in order to shorten a list of a menu in an application example, and an illustration of a menu offering a shortened list as a function of the document in FIG. 5a in said application example.

DETAILED DESCRIPTION OF ILLUSTRATIVE EMBODIMENTS

Figure 1:
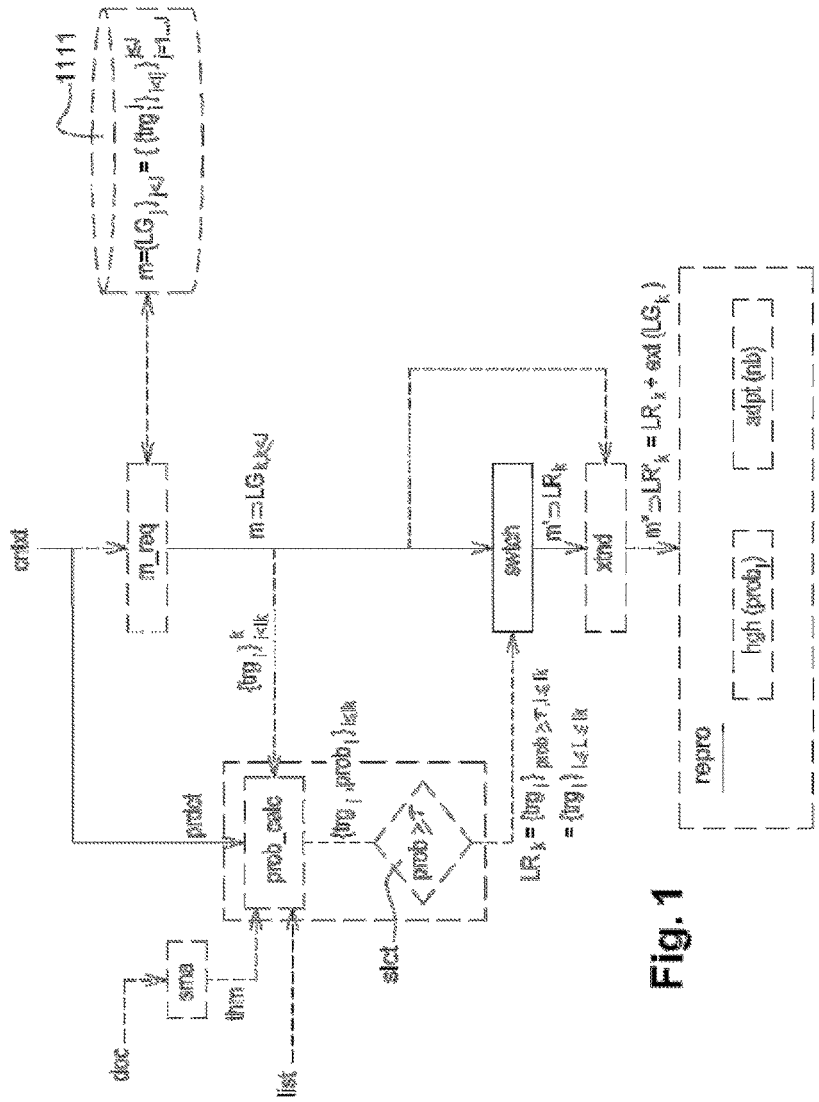
FIG. 1 shows a simplified diagram of a method for adaptation of a menu according to an aspect of the present disclosure.

FIG. 1 illustrates a simplified diagram of a method for adaptation of a menu according to an exemplary embodiment of the present disclosure.

The method for adaptation of a menu adapts a menu m to a use context cntxt. The menu m has at least one global list LGj of trigger elements $\{trg_i\}$. The method for adaptation involves replacement swtch of a global list LGk of trigger elements, when said menu m is reproduced repro, with a shortened list LRk having predicted trigger elements $\{trgp_l\}_{l=L \leq Ik}$ among the trigger elements $\{trg_i\}_{i \leq Ik}$ of said global list LGk. The predicted trigger elements $trg_l$ are trigger elements $trg_i$ that have a higher probability of being selected in said use context than a selection threshold: $prob_i = prob(trgi) \geq \tau$.

The use context depending on the user is also called a user profile. The reason is that the use context is a function of the user and/or of the terminal chosen by the user in order to reproduce said menu and/or of the schedule of the user.

Thus, for applications intended for users that teach, the use context takes account notably:
- of the subject taught by the user in order to adapt the menu (either the method for adaptation of the knows said subject or it determines it from the use of the application by the teacher); and/or
- of the terminal used (for example the teacher preferably uses a computer to produce his lessons, a table to modify them and his smart phone to control the presentation thereof to his pupils);
- of the schedule (for example during his lessons the teacher does not use the lesson production actions).

One or more of these behaviors by the user are, notably, determined by the method for adaptation in order to calculate the probability of selection of a trigger element and to adapt the menu.

In particular, the method for adaptation involves recovery of a menu m_req (also called obtainment of a menu) from a memory 1111. The recovery allows, for a requested menu m, recovery of all of the global lists $\{LGj\}_{j<J}$ from which it is made up, that is to say all of the trigger elements $\{trg_i\}_{i<Ij}$ for each of the global lists $LG_j$ that makes up said menu m.

In particular, the method for adaptation involves prediction prdct of the trigger elements that have a higher probability of being selected in said use context than a selection threshold τ among the trigger elements of a global list of said menu. The prediction involves, notably, calculation of the probability prob_calc of selection of each trigger element $\{trg_i\}_{i \leq Ik}^{k}$ of a global list $LG_k$, then selection slct, among the trigger elements $trg_i$, of those for which the calculation probability $prob_i$ is higher than a threshold τ, thus providing the predicted trigger elements $trg_l$. Thus, the shortened list LRk is made up of a set of trigger elements having a higher probability than a selection threshold $\{trg_i\}_{prob_i \geq \tau, i \leq I_k}$ corresponding to a set of predicted trigger elements $\{trg_i\}_{l \leq L \leq I_k}$.

Notably, a trigger element of a menu allows triggering either of processing on a datum or a previously selected content or access to one or more data or content, or filtering of data, content or other documents provided by an application, etc.

In particular, the predicted trigger elements are a function of at least one content doc previously selected in an application using said menu.

In particular, the predicted trigger elements are a function of at least one content doc previously injected into an application using said menu.

Notably, the method for adaptation involves semantic analysis sma of a content doc, such as a previously selected content or a previously injected content. The results thm of semantic analysis sma are used for determining the predicted trigger elements. In particular, the prediction prdct is a function of these results thm, and, therefore, indirectly of the previously selected and/or injected content doc.

In particular, the predicted trigger elements are a function of the trigger elements of said global list that have previously been selected in one and the same use context hist.

In particular, the prediction prdct is a function of the trigger elements of said global list that have previously been selected in one and the same use context hist.

In particular, the predicted trigger elements $trgp_l$ are organized in said shortened list LRk as a function of their probability of being selected in said use context $prob_l$.

In particular, the shortened list LRk furthermore has a trigger element ext allowing the global list LGk to be displayed when said trigger element ext is selected. Notably, the method for adaptation involves menu extension xtnd allowing the addition, to a shortened list LRk made up of predicted trigger elements, of a trigger element ext allowing triggering of reproduction of the global list LGk instead of reproduction of the shortened list LRk when the trigger element ext is selected. Thus, the global list LGk can be substituted for the shortened list LRk when the menu is reproduced on demand by the user.

In particular, the method for adaptation involves reproduction repro of the menu m' having at least one shortened list LRk.

In particular, the method for adaptation involves reproduction adapt of the predicted trigger elements $trgp_l$ of said shortened list LRk as a function of the number nb of predicted trigger elements of said shortened list.

In particular, the method for adaptation involves reproduction hgh of the predicted trigger elements of said shortened list as a function of their probability of being selected in said use context $prob_l$.

An embodiment of the method for adaptation of a menu according to an exemplary aspect of the disclosure is a program comprising program code instructions for the execution of the steps of the method for adaptation of a menu when said program is executed by a processor.

The disclosure furthermore concerns a method for generation of a menu. The menu m has at least one global list LGj of trigger elements $\{trg_i\}$. The method for generation of a menu m involves adaptation of said menu m to a use context cntxt by replacement swtch of a global list LGk of trigger elements, when said menu m is reproduced repro, with a shortened list LRk having predicted trigger elements $\{trgp_l\}_{l \leq L \leq Ik}$ among the trigger elements $\{trg_i\}_{i \leq Ik}$ of said global list LGk. The predicted trigger elements $trg_l$ are trigger elements $trg_i$ that have a higher probability of being selected in said use context than a selection threshold: $prob_i = prob(trgi) \geq \tau$.

An embodiment of the method for generation of a menu according to an aspect of the disclosure is a program comprising program code instructions for the execution of the steps of the method of generation of a menu when said program is executed by a processor.

Figure 2:
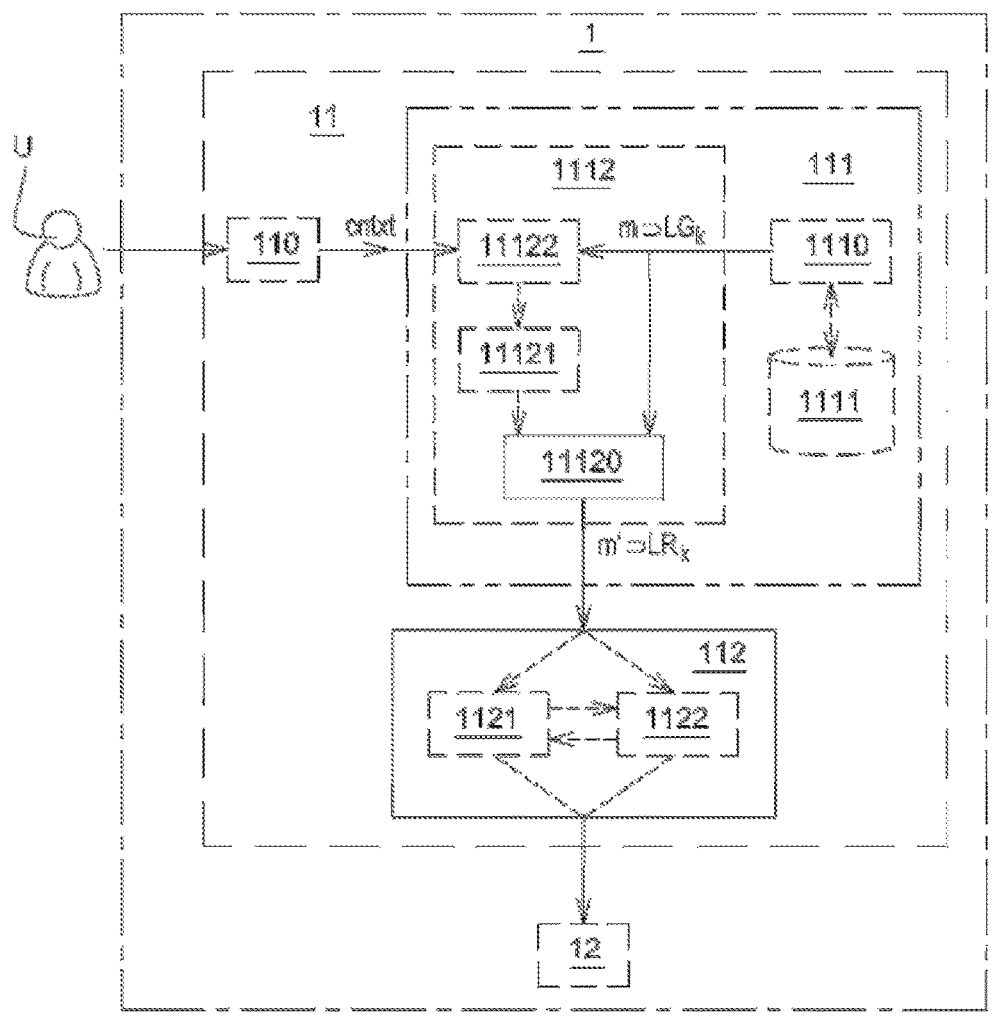
FIG. 2 shows a simplified diagram of an adapter for adapting a menu according to an aspect of the present disclosure.

FIG. 2 illustrates a simplified diagram of an adapter 1112 for adapting a menu m to a use context cntxt according to an aspect of the disclosure.

The adapter 1112 has a switch 11120 for replacing, when said menu m is reproduced, a global list LGk of trigger elements of said menu m with a shortened list LRk having predicted trigger elements among the trigger elements of said global list. Said predicted trigger elements are trigger elements that have a higher probability of being selected in said use context than a selection threshold.

In particular, the adapter 1112 has a prediction device (11121, 11122) providing at least one shortened list LRk made up of predicted trigger elements along the trigger elements of a global list LGk of the menu. The predicted trigger elements are the trigger elements of the global list for which the probability of being selected in the use context in progress is higher than a predefined selection threshold.

In particular, the prediction device has a probability calculator 11121 that calculates, for each trigger element of at least one global list LGk of the menu m, the probability of selection of said trigger element in the selected use context cntxt. The probability calculator 11121 provides the calculated probabilities for a selector 11122 of said prediction device. The selector 11122 thus selects the predicted trigger elements among the trigger elements of the global list as a function of the calculated probabilities.

In particular, a user U has a terminal 1 having:
an application 11;
and a reproduction interface 12, such as a screen, or loudspeakers, etc.

The application 11 has a menu m. The menu m has at least one global list LGk of trigger elements. The trigger elements allow said application 11 to implement predetermined actions associated with said trigger elements. The application 11 has an adapter 1112 for adapting said menu m to a use context cntxt by replacing (by means, notably, of a switch 11120) a global list LGk of trigger elements, when said menu m is reproduced, with a shortened list LRk having predicted trigger elements among the trigger elements of said global list. The predicted trigger elements are trigger elements that have a higher probability of being selected in said use context than a selection threshold.

In particular, the application 11 has a menu recoverer (also called menu obtainment module) 1110 in a menu database 1111 allowing the menu adapter 1112 to be provided with all of the global lists LGk making up an application menu 11.

In particular, the application 11 has a reproduction device 112 allowing a reproduction interface to be provided with the menu that is to be reproduced. Notably, the reproduction device 112 has an organizer 1121 allowing the predicted trigger elements of a shortened list of the menu that is to be reproduced to be classified in an order of decreasing probability.

As an alternative or in addition to the organizer, the reproduction device 112 has an arranger 1122 allowing modification of the arrangement of the menu as a function of the number of trigger elements of the shortened list and/or as a function of their probability of being selected.

By way of example, the arranger 1122 defines the size of the rectangle for display of a trigger element and/or the size of display policy for a trigger element as a function of the number of trigger elements of the shortened list. As another example, the size of display policy for a trigger element may be proportional to the probability of selection of said trigger element. Additionally, the display policy and/or the underlining color, etc., for a trigger element may be a function of the probability of selection of said trigger element.

In particular, the terminal 1, notably the application 11, has an adaptable menu generator 111 having at least one global list of trigger elements. The generator 111 has an adapter 1112 for adapting said menu to a use context by replacing (notably by means of a switch 11120) a global list of trigger elements, when said menu is reproduced, with a shortened list having predicted trigger elements among the trigger elements of said global list, said predicted trigger elements being trigger elements that have a higher probability of being selected in said use context than a selection threshold.

In particular, said generator 111 has a menu recoverer 1110 in a menu database 1111.

FIG. 3 illustrates a simplified diagram of an application example implementing an aspect of the disclosure.

In this case, the application 21 offers to produce second content such as a teaching document, or an educational presentation, from first existing content, such as educational project sheets, photographs, videos, news articles or textbooks, etc.

In the example illustrated by FIG. 3, a user U implements the application 21 from a terminal such as a tablet or a Smartphone $1_T$, or a computer $1_O$ connected to a service provision device 2 that offers said application 21.

The application 21 implements its front portion 210, or front in English, for relating the application 21 to at least one terminal $1_T$ or $1_O$ of a user U, and its back portion 211, or back end, for executing the application itself.

Notably the back end 211 has a semantic analyzer 2113 made, by way of example, of (an) extractor(s) such as an extractor of named entities 2113E, a theme extractor 2113T, a language identifier 2113L, a concept extractor 2113C, etc. The semantic analyzer 2113 notably analyzes a document when it is injected into the application, that is to say that this document is loaded into one of the databases of the application, and associates at least the result thm of this analysis therewith. The result of the analysis thm is notably made up of one or more of the following data: a named entity provided by the extractor $2113^E$ and/or a theme provided by the extractor 2113T and/or a language provided by the identifier 2113L and/or a concept provided by the extractor 2113C.

The back end 211 of the application from the example in FIG. 3 also has an enhancement device 2114 made up notably of a video enhancer 2114V (VOD/TVOD), an audio enhancer 2114P, notably allowing the use of radio Internet broadcasting (podcasts in English) to enhance a second document, a text enhancer 2114N, notably using e-press articles, or data enhancement from various peripherals or personal data. These enhancers 2114V, 2114P, 2114N, 2114O recover the first documents in enhancement data directories 2115, such as a video catalog, notably for video on demand and/or TV on demand, 2115V, public podcasts 2115P, a digital news stand 2115N, a selection of educational content 2115O.

Thus, when the user U, upon generation of a second document by the application 21, uses its terminal $1_T$ to select a first document to use as a basis for said generation: notably the selection of an educational project sheet, the results thm of the prior semantic analysis of the first selected document by the analyzer 2113 will be used to generate the shortened list of the menu for this application so that the switch 21120 replaces the global list of the menu with the shortened list as a function of this result thm.

The new menu benefits from a virtuous circle made up of the learning (calculation of probability of being selected as a function of the documents that have previously been used, notably selected or injected) and the contextualization or automatic adaptation of the menu in order to offer the user a relevant list. All of the named entities of the text of a document doc: word, expression, sentence, date, acronyms, etc., shed light on the "meaning" of the document doc and allow the document to be situated in a specific environment in order to deduce therefrom at least one triggering element to be introduced into a shortened list of a menu. The method for adaptation of the menu is carried out each time the menu is used: selection of a trigger element of a menu brings about automatic adaptation of the menu. This iterative loop allows an adapted menu or contextual menu specific to the needs of the user to be offered.

The number of choices offered by the menu is reduced so as to be optimized as a function of the following actions: selection of a pre-existing document from a document base associated with the application, semantic analysis of a document injected by the user into the document base associated with the application.

Figures 4A, 4B:
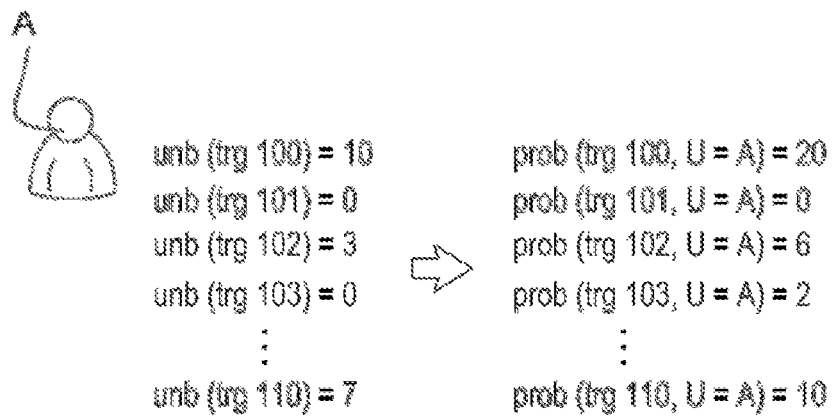

FIG. 4a illustrates a simplified diagram of a menu without adaptation.

A menu m is made up of a plurality of lists of trigger elements, in this case a plurality of global lists $LG_1$, $LG_2 \ldots LG_N$. The list LG1 notably has the trigger elements trg100, trg101, trg102 . . . trg1xy.

The menu is notably displayed as shown in FIG. 1 or in other forms of display, such as a tab menu, a circular menu or other forms of reproduction: voice menu, haptic menu, etc.

FIG. 4b illustrates a simplified diagram of generation of a shortened list when a menu according to an aspect of the disclosure is adapted.

The use context is notably the use of the menu by a user A.

In the case of the illustration in FIG. 4b, the shortened list is a function of the previous selections from the same context. In this case, the user A has already selected unb=10 times the trigger element trg100 of the global list LG1 of the menu m, 0 times the trigger element trg101, 3 times the trigger element trg102, 0 times the trigger element trg103 . . . 7 times the trigger element 110, etc.

These previous instances of use of the menu m in the same use context, namely use of the menu m by the user A, allow calculation of the probability of selection of each of the elements of the global list LG1 by the user A. Notably, the probability of the user A selecting the trigger element trg100 is 20%, the trigger element trg101 is 0%, the trigger element trg102 is 6%, the trigger element trg103 is 2% . . . the trigger element trg110 is 10%, etc.

Thus, if the selection threshold is 2%, the shortened list LR1 is made up of the trigger elements for which the probability of being selected is greater than or equal to 2% or {trg100, trg102, trg103 . . . trg110, etc.} but not notably of the selection element 101, for which the probability is zero.

Thus, when an application offers multiple instances of use as a function of the type of user, the menu will be able to be adapted to the type of user. By way of example, if the menu allows access to teaching content, the teacher wishing to access this content will be able to be offered a menu adapted to the subjects and/or grades for which he is teaching. As another example, for an application allowing management of a database, such as content, the menu can be adapted to the various types of user: content originator, content integrator, content broadcaster, etc., in order to offer them only the action trigger elements that are useful to them, in each case, capture actions, modification actions, creation actions, etc., for the content originators, content search actions, content aggregation actions, etc. For content originators, coding actions, transmission actions, etc., for content broadcasters, etc.

FIG. 4c(1) illustrates a first variant of an adapted menu according to an aspect of the disclosure. Instead of the global lists of the menu m, this variant displays the shortened lists LR1, LR2, . . . LRN generated by an aspect of the disclosure. In particular, the shortened list LR1 made up of the predicted trigger elements trg100, trg102, trg103 . . . trg110, etc., in the order of the global list LG1 without adaptation of the specific reproduction.

FIG. 4c(2) illustrates a second variant of an adapted menu according to an aspect of the disclosure. In this second variant the trigger elements are organized as a function of their probability of being selected as illustrated by the shortened list LR1: trg100 . . . trg110 . . . trg102 . . . trg103.

FIG. 4c(3) illustrates a third variant of an adapted menu according to an aspect of the disclosure. In this third variant the size of the display policy is proportional to the probability of a trigger element being selected.

Figure 5A:
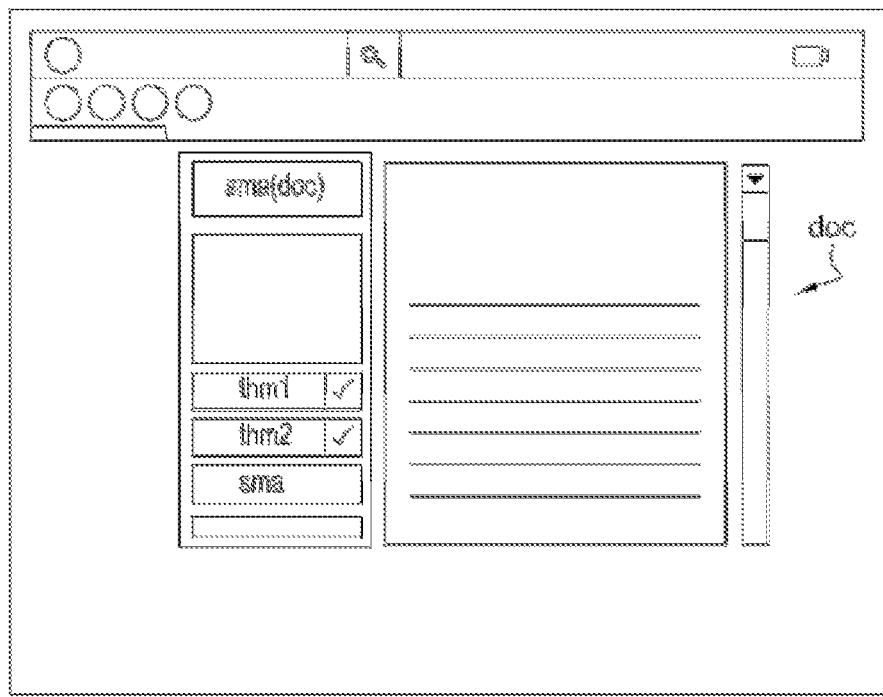

FIG. 5a shows an illustration of a document doc allowing determination of a predicted trigger element in order to shorten a list of a menu in an application example.

By way of example, if a user U asks to load the document doc into the application 21. The loading of this document doc will trigger semantic analysis sma. The result of the semantic analysis of the document sma (doc) has the themes thm1 and thm2, for example.

In the case of our application example, namely the generation of educational documents, these themes are notably the subject(s) dealt with by the document (for example history), and/or the educational grade(s) (for example third grade).

Figure 5B:
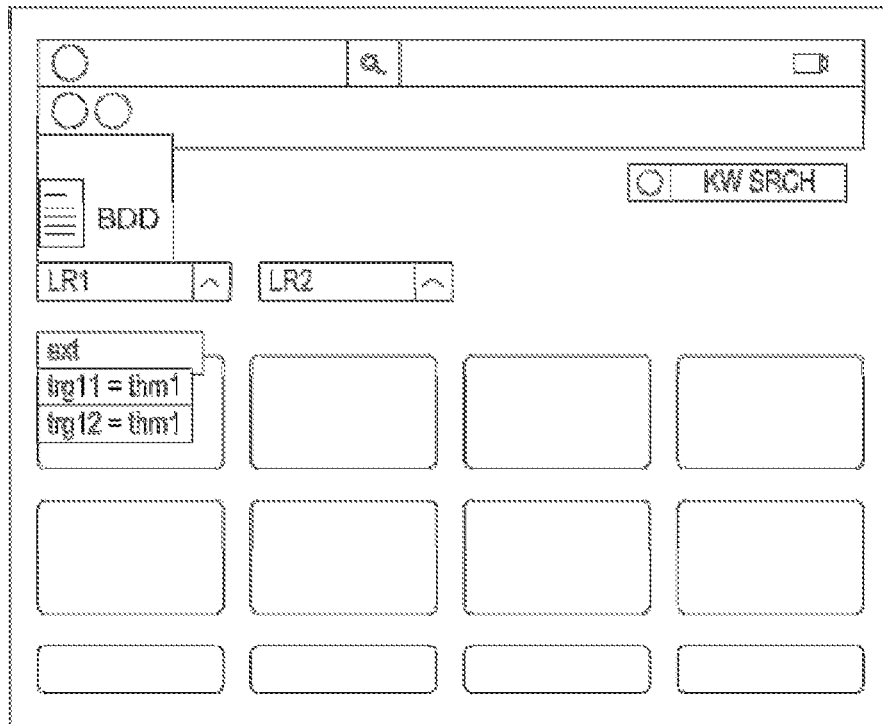

FIG. 5b shows an illustration of a menu offering a shortened list as a function of the document from FIG. 5a in this application example.

When the user U wishes to access documents BDD (first and/or second documents) of the application 21, the application can provide him with a menu for filtering the documents in order to limit the number of documents shown so as to facilitate use thereof.

The filtering menu may exhibit one or more filtering criteria that are each made up of a list of trigger elements, in particular two lists LR1 and LR2, which in our example are a list for filtering as a function of subject and a list for filtering as a function of educational grade.

The previous instances of use of documents by the user U have allowed these two lists LR1 and LR2 to be shortened. Notably, the shortened list LR1 has a trigger element trg11 for triggering as a function of the result thm1 of the semantic analysis of the document doc in FIG. 5a. In this case, the trigger element trg11 corresponds to the subject "history" owing to the "history" theme of the document doc. The trigger element trg12 corresponds to another probability of being selected that is higher than a predetermined threshold. And the trigger element ext allows reproduction of the global list from which the shortened list LR1 has come.

Thus, in the case of a teacher who is teaching history/ geography in the 5th, 4th and 3rd grades, a classic menu will offer him the opportunity to select his subject from a list of at least 23 trigger elements and his teaching grades from a list of at least 15 trigger elements, whereas an exemplary embodiment of the disclosure will allow these lists to be shortened: the "subjects" list will offer him only two trigger elements and the "grade" list only three trigger elements.

This adapted menu is generated from:

simple actions such as the selection of a document offered by the application that has been the subject of prior semantic analysis. Recurrence of the action bringing about an update to the lists of the menu. Example: the teacher selects the educational project sheet for history/geography in the 5th grade or the corresponding official form, the application records this action and shortens the lists of the menu to these subjects and this class.

complex actions: analysis of a document by semantic processing modules in order to extract keywords and a context therefrom. From this analysis, the application identifies the subject(s) and the grade(s) in question. By way of example, the teacher submits a text. Following analysis, the application detects that it is about the First World War. The application deduces therefrom that this is a history program for the 3rd grade and updates the list(s) of trigger elements of the menu.

Through these two actions, the menu is adapted and offers the teacher lists shortened to the subjects of history and geography, and to the 5th and 3rd grades.

A further aspect of the present disclosure relates to a medium, such as a non-transitory medium. The non-transitory information storage medium may be any entity or device that is capable of storing a program according to an aspect of the disclosure. By way of example, the non-transitory medium may include a storage means such as a ROM, for example a CD-ROM, or a microelectronic circuit ROM or else a magnetic recording means, for example a floppy disk, a hard disk or flash drive.

On the other hand, the information storage medium may be a transmissible medium such as an electrical or optical signal, which can be conveyed via an electrical or optical cable, by radio or by other means. The program according to an aspect of the disclosure may be downloaded on a network notably of Internet type, in particular.

Alternatively, the information storage medium may be an integrated circuit that incorporates the program, the circuit being suited to executing or to being used in the execution of the method in question.

In another implementation, an exemplary method according to the disclosure is implemented by means of software and/or hardware components. From this aspect, the term module may correspond either to a software component or to a hardware component. A software component corresponds to one or more computer programs, one or more subroutines in a program, or more generally to any element of a program or of a piece of software that is capable of implementing a function or a set of functions according to the description above. A hardware component corresponds to any element of a hardware assembly that is capable of implementing a function or a set of functions.

Although the present disclosure has been described with reference to one or more examples, workers skilled in the art will recognize that changes may be made in form and detail without departing from the scope of the disclosure and/or the appended claims.

What is claimed is:

1. A method comprising:
   automatically adapting a menu of an application to a use context by a data processing device, said menu having at least one global list of trigger elements, each trigger element being associated to an action which is implemented by the application by processing data or content when said trigger element is selected, wherein adapting comprises replacing a global list of trigger elements, when said menu is reproduced, with a shortened list having predicted trigger elements among the trigger elements of said global list, said predicted trigger elements being trigger elements of said global list that, in said use context, have a higher probability of being selected than a selection threshold.

2. The method of claim 1, wherein said method comprises predicting the trigger elements that have a higher probability of being selected in said use context than a selection threshold among the trigger elements of a global list of said menu.

3. The method according to claim 1, wherein the predicted trigger elements are a function of at least one content previously selected in the application using said menu.

4. The method according to claim 1, wherein the predicted trigger elements are a function of at least one content previously injected into the application using said menu.

5. The method according to claim 1, wherein the predicted trigger elements are a function of the trigger elements of said global list that have previously been selected in one and the same use context.

6. The method according to claim 1, wherein the predicted trigger elements are organized in said shortened list as a function of their probability of being selected in said use context.

7. The method according to claim 1, wherein said shortened list furthermore has a trigger element allowing the global list to be displayed when said trigger element is selected.

8. The method according to claim 1, wherein said method comprises reproducing the predicted trigger elements of said shortened list as a function of the number of predicted trigger elements of said shortened list.

9. The method according to claim 1, wherein said method comprises reproducing the predicted trigger elements of said shortened list as a function of their probability of being selected in said use context.

10. A non-transitory computer-readable medium comprising program code instructions stored thereon for execution a method for adaptation of a menu when said program is executed by a processor, wherein the instructions comprise:
    instructions that configure the processor to adapt automatically the menu of an application to a use context, said menu having at least one global list of trigger elements, each trigger element being associated to an action which is implemented by the application by processing data or content when said trigger element is selected, including instructions that configure the processor to replace a global list of trigger elements, when said menu is reproduced, with a shortened list having predicted trigger elements among the trigger elements of said global list, said predicted trigger elements being trigger elements of said global list that, in said use context, have a higher probability of being selected than a selection threshold.

11. An apparatus comprising:
    means for automatically adapting a menu to a use context, said menu having at least one global list of trigger elements, each trigger element being associated to an action which is implemented by the application by processing data or content when said trigger element is selected, said means for adapting comprising:
    a switch configured to replace, when said menu is reproduced, a global list of trigger elements of said menu with a shortened list having predicted trigger elements among the trigger elements of said global list, said predicted trigger elements being trigger elements that have a higher probability of being selected in said use context than a selection threshold.

\* \* \* \* \*